Figure 1:
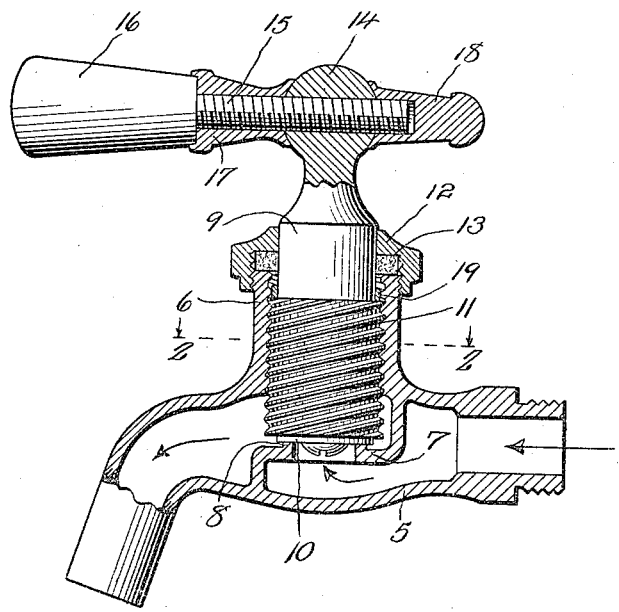

H. E. KRUECKE.
FAUCET.
APPLICATION FILED APR. 30, 1918.

1,293,476.

Patented Feb. 4, 1919.

Witness:
T. P. Britt

Inventor:
Herman E. Kruecke
By Geo. W. Young
Attorney

UNITED STATES PATENT OFFICE.

HERMAN E. KRUECKE, OF MILWAUKEE, WISCONSIN, ASSIGNOR TO KRUECKE BROS. MFG. CO., OF MILWAUKEE, WISCONSIN.

FAUCET.

1,293,476.      Specification of Letters Patent.      Patented Feb. 4, 1919.

Application filed April 30, 1918. Serial No. 231,596.

*To all whom it may concern:*

Be it known that I, HERMAN E. KRUECKE, a citizen of the United States, and resident of Milwaukee, in the county of Milwaukee and State of Wisconsin, have invented certain new and useful Improvements in Faucets; and I do hereby declare that the following is a full, clear, and exact description thereof.

My invention relates to new and useful improvements in faucets, more particularly of that quick closing type including a valve stem having screw threaded engagement of relatively great pitch with a sleeve like projection of the valve casing.

It is in general the object of my invention to simplify the structure and improve the efficiency of valves of this nature, and more particularly it is an important object to provide an arrangement whereby the handle of the valve is connected with the stem in such manner as to prevent its possibly becoming loose, in contradistinction to those types of valve handles which include a sleeve like portion fitting on the stem.

A still further object resides in the provision of a means for limiting the opening movement of the valve, which means serves also to procure a tight packing of the valve stem in open position, and in this connection it is a further object to provide a limiting means which permits of adjustment to provide for differing desired limits of opening movement.

With the above and other objects and advantages in view, the invention resides more particularly in the novel combination, formation and arrangement of parts hereinafter described and pointed out in the appended claims.

In the drawings:

Figure 1 is a vertical sectional view through a valve constructed in accordance with the present invention.

Figure 2:
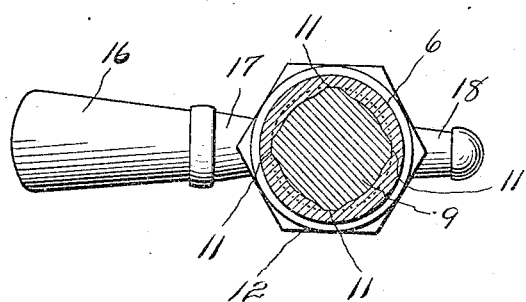

Fig. 2 is a transverse sectional view therethrough on the line 2—2 of Fig. 1.

Referring now more particularly to the accompanying drawings, 5 designates a valve casing of conventional type from the intermediate portion of which extends a sleeve 6 and which is provided adjacent said sleeve with the usual ported partition 7 provided with a valve seat 8. The usual valve stem 9 is positioned in the sleeve and carries a head gasket 10 on its lower end adapted to engage on the seat 8, and this valve stem is provided with threads 11 of relatively great pitch, said threads being arranged in series of four, whereby to procure a relatively great amount of frictional surface to prevent possible accidental opening movement of the valve. A cap 12 is slidable on the upper projected end of the stem and is threaded on the sleeve, and disposed between the cap and the end of the sleeve is a packing gasket 13.

The upper end of the valve stem terminates in a ball head 14 and this ball head is provided with a transverse threaded bore in which is threadedly engaged a bolt 15 carried by a handle 16 preferably of porcelain or the like and threaded in the bolt between the handle 16 and the ball head 14 is a sleeve 17 and the bolt is projected past the head for threaded engagement of an ornamental cap member 18. Thus a finished handle structure is provided which may be most readily assembled, and wherein the bolt is rigidly carried by the porcelain handle 16 to thus eliminate the necessity of objectionable screw threads in the porcelain handle. By the threaded engagement of the sleeve 17, ball head 14 and cap 18 with the bolt, said parts are frictionally locked together to prevent accidental disengagement. The bore of the head 14 is formed with particular relation to the arrangement of the threads on the valve stem and to the length of said stem, whereby when said bore is disposed longitudinally of the general plane of the valve, the valve is in closed position. Thus by the provision of this particular relation of the bore to the valve stem and threads, the provision of an angular adjustment of the stem with respect to the head, such as has been heretofore employed, is avoided, to thus produce a neater and more attractive handle structure, and to eliminate the possibility of the handle becoming rotatively loose on the valve stem.

The valve stem is reduced in size above the threads 11, forming a shoulder, and the reduced portion of the stem slides through the cap, and disposed between the shoulder and the packing gasket 13 is a sleeve 19, and thus the distance between the top of the sleeve 19 and the packing gasket 13 determines the relative degree of movement of the valve stem and consequently the degree of opening movement of the valve. Thus by providing sleeves or rings of different sizes, an adjustment of the opening movement of the valve is afforded. At the same time, the sleeve in the open movement of the valve, engages and compresses the packing gasket 13 immediately adjacent the stem to thus positively prevent any leakage. It is noted that in the seating position of the valve, the distances between the upper edge of the sleeve 19 and the packing gasket 13 is less than half of the pitch of the threads 11, that is, the distance between adjacent convolutions of any one of the threads which as stated, are four in number. Thus, less than half a revolution of the handle and valve is necessary to move the valve from seating position to full open position with the sleeve 19 engaging the packing and to compress the packing to prevent possible leakage through the stem due to the pressure in the valve casing due to the full opening of the valve.

What is claimed is:

1. A valve comprising a casing including a sleeve projection, a seat in the casing, a packing disposed at the outer end of the sleeve, a valve stem in threaded engagement with the sleeve and projected through the packing, a head on the valve stem engageable with the seat, a shoulder on the valve stem adjacent the packing, and a sleeve detachably mounted on the stem between the shoulder and packing and abuttingly engageable with the packing upon opening movement of the stem.

2. In a valve, the combination with a valve stem provided with a transverse bore, of a handle, a bolt projecting from the handle and threadedly engaged in the bore, a sleeve threaded on the bolt between the bore and handle and cap member threaded on the outer end of the bolt, said handle, sleeve, valve stem and cap member being in abutting relation.

In testimony that I claim the foregoing I have hereunto set my hand at Milwaukee, in the county of Milwaukee and State of Wisconsin.

HERMAN E. KRUECKE.